Nov. 20, 1923.

G. W. VREELAND

SCREEN FOR DUST CATCHERS

Filed Oct. 17, 1921

1,474,921

Witnesses:
Edwin Trueb

Inventor:
GEORGE W. VREELAND,
By D. Anthony
his Attorney.

Patented Nov. 20, 1923.

1,474,921

UNITED STATES PATENT OFFICE.

GEORGE W. VREELAND, OF STEUBENVILLE, OHIO.

SCREEN FOR DUST CATCHERS.

Application filed October 17, 1921. Serial No. 508,275.

*To all whom it may concern:*

Be it known that I, GEORGE W. VREELAND, a citizen of the United States, and resident of Steubenville, in the county of Jefferson and State of Ohio, have invented certain new and useful Improvements in Screens for Dust Catchers, of which the following is a specification.

This invention relates to dust catchers and more particularly to dust catchers adapted to separate flue dust and other foreign matter from hot blast furnace gases, and has for one of its objects the provision of such an apparatus having means for separating the coarse and fine particles of matter after such matter is separated from the gases and before such matter is discharged from the dust catcher.

Heretofore the foreign matter which consists principally of flue dust (fine particles of ore), coke, and lime stone, has been separated from the blast furnace gases in suitable dry gas cleaners or other dust catchers and dumped directly into cars which conveyed it to a sintering plant where it was screened to separate the coarse particles of coke and lime stone from the flue dust, and the dust sintered in any well known manner. The above practice was necessarily dirty since the finely divided flue dust would blow around when handled, and especially while being screened, thus covering the surrounding territory with a coating of the dust. Furthermore the coke and lime stone particles separated from the flue dust at the sintering plant must be conveyed back to the blast furnace to be recharged into such furnace.

The present invention eliminates the necessity of screening the foreign matter at the sintering plant since the coarse matter consisting principally of coke and lime stone is separated before being discharged from the dust catcher, and discharged through separate outlets. Furthermore it is not necessary to haul the coke and lime stone particles any great distance since the dust catchers are always located adjacent the blast furnaces and the separated coke and lime stone may be immediately recharged into an adjacent furnace without further handling.

Figure 1:
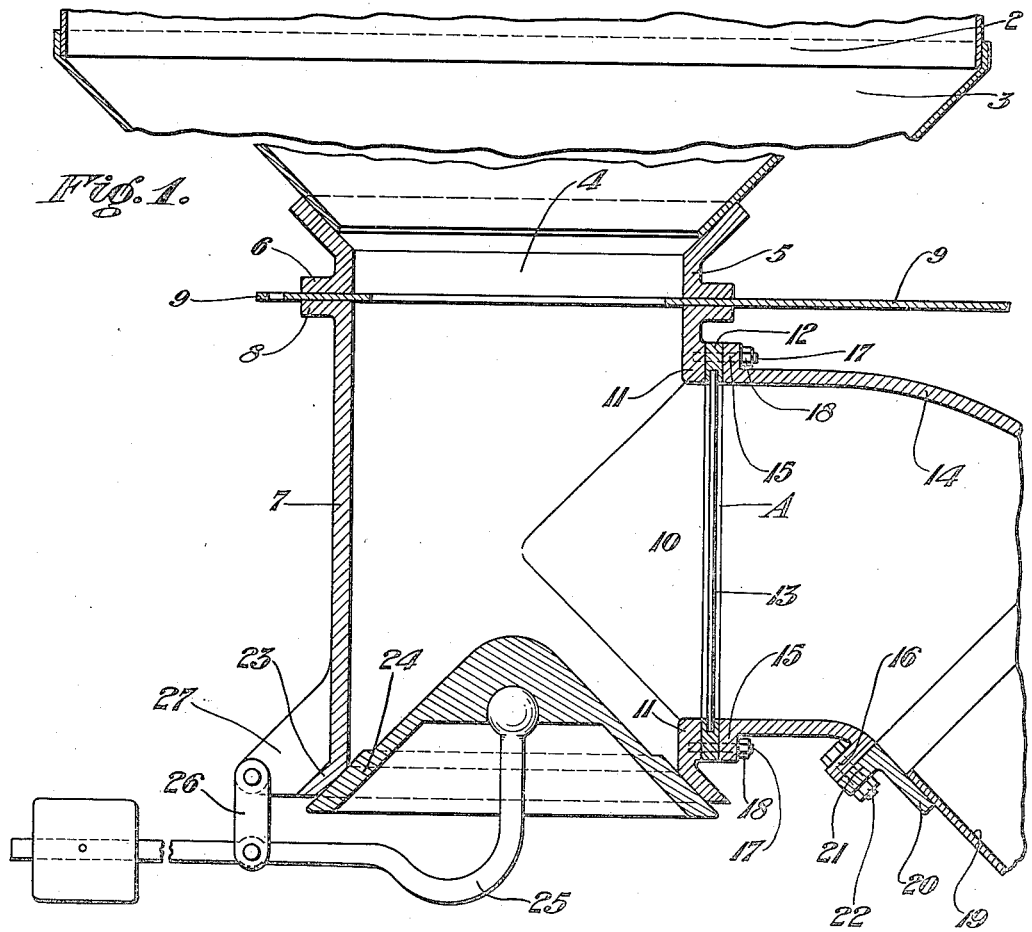

Referring to the drawings, Figure 1 is a vertical sectional elevation through the lower end of a dust catcher having my invention applied thereto.

Figure 2:
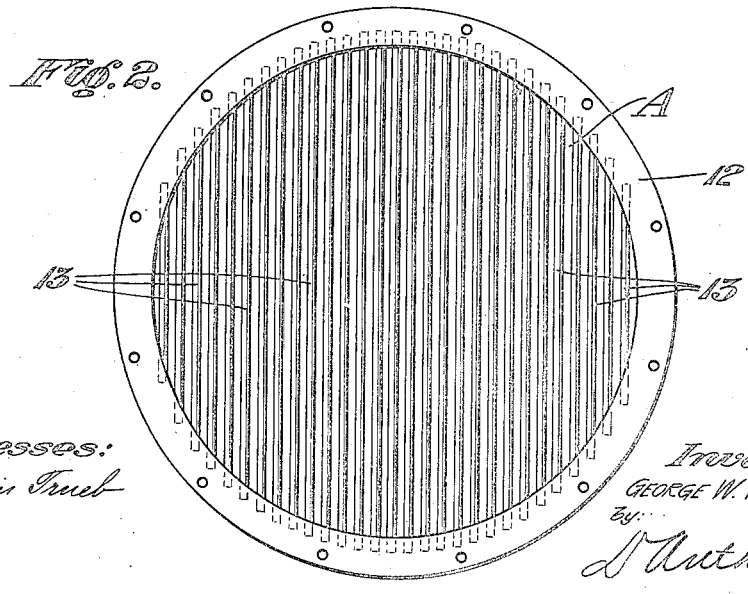

Figure 2 is a detail elevation of the screen for separating the fine and coarse particles of matter discharged from the dust catcher.

In the drawings, the numeral 2 designates the sheet metal shell or body portion of a dry gas cleaner or other dust catcher having a frusto-conical bottom portion 3 provided with a central outlet or discharge port 4. A rim or ring 5 having a flange 6 around its lower edge is secured to the bottom 3 around the discharge port 4, and a T-shaped hollow casting member 7 is arranged below the ring 5. The member 7 has its head or cross portion which has an internal diameter equal to the internal diameter of the ring 5 secured by a flange 8 to the flange 6 on the ring 5 and serves as a receiving chamber for the foreign matter separated from the gas in the dust catcher.

The contacting faces of the flanges 6 and 8 are cut away at diametrically opposite sides to form a passageway for a goggle valve 9 which serves to close the discharge port 4 when desired or necessary.

The leg or branch 10 of the T-shaped member 7 terminates at its outer end in a flange 11 and a screen member A comprising a ring 12 and vertical bars 13 is adapted to abut the flange 11 and an elbow 14 having flanges 15 and 16 on its upper and lower ends is fitted against the ring 12 of the screen. Both the screen and elbow 14 are held in position against the flange 11 by stud bolts 17 which are tapped into the flange 11 and pass through suitable apertures in the ring 12 and flange 15 of the elbow 14 and have nuts 18 screwed on their outer ends.

A suitable sheet metal conduit 19 has a cast metal ring 20 secured to its upper end, provided with a flange 21 adapted to abut the flange 16 on the elbow member 14 and is secured to the member 14 by bolts 22 which pass through suitable apertures in the flanges 16 and 21.

The lower end of the head or cross portion of the member 7 is open to form a discharge port, and the lower edge of said member is flared outwardly to form a seat 23 for a closing bell 24. The bell 24 is operatively connected to a counterweighted lever 25 which is pivotally connected intermediate its ends to a link 26, which in turn is connected to a bracket 27 secured on the side wall of the member 7. When a predetermined amount of matter has collected in the member 7 its weight will automatically open the bell 24 and allow the matter to discharge into a suitable car or other receptacle not shown.

Those familiar with blast furnace practice know that hot flue dust flows almost as freely as water and having this in mind the operation of this invention will be described as follows:—

The separated foreign matter from the dust catcher will fall by gravity into the member 7 where it will build up on the bell 24. After a sufficient amount of the matter has built up on the bell 24 to bring its level to approximately the lower edge of the screen member A the fine dust will flow through the screen A, and the coarse matter, which includes the coarse particles of coke and lime stone, will be held back and built up in the member 7 until a sufficient amount has been deposited to overcome the counterweighted lever 25 and open the bell 24 to discharge such coarse matter. The flue dust which flows through the screen A will continue to flow through the elbow 14 and conduit 19 to a suitable receptacle, not shown, but preferably to a pug mill such as shown and described in my co-pending application, Serial No. 507,410 filed October 13, 1921.

While I have shown and described only one embodiment of my invention, I do not wish to be limited thereto, since various modifications may be made without departing from the spirit of my invention, as described in the appended claims.

I claim:—

1. The combination with a dust catcher for separating flue dust and other foreign matter from blast furnace gases, having a discharge port for the separated matter and a goggle valve for controlling said discharge port, of a chamber below said dust catcher discharge port, said chamber being provided with a discharge port in the lower end thereof and a second discharge port in the side wall thereof, means for closing the discharge port in the lower end of said chamber, a conduit leading from the discharge port in the side wall of said chamber, and a screen mounted in said last named discharge port whereby the fine particles of matter are permitted to pass through said conduit and the coarse matter is retained in said chamber.

2. The combination with a dust catcher for separating flue dust and other foreign matter from blast furnace gases, having a discharge port for the separated matter, of a chamber below said discharge port, said chamber being provided with two separate discharge ports, a screen mounted in said chamber adapted to separate the coarse and fine particles of matter, said screen being so positioned that the coarse and fine separated particles will flow through different ones of said discharge ports in said chamber, and means for closing the discharge port through which said coarse particles are adapted to flow to thereby cause an accumulation of such particles, said means being adapted to automatically open when a predetermined quantity of said coarse particles have accumulated.

3. The combination with a dust catcher for separating flue dust and other foreign matter from blast furnace gases, having a discharge port for the separated matter and a valve for controlling said discharge port, of a chamber below said discharge port, said chamber being provided with a discharge port in the lower end thereof and a second discharge port in the side wall thereof, and a screen mounted in said chamber adapted to separate the coarse and fine particles of matter so that said separated particles will be discharged through separate ones of said discharge ports.

In testimony whereof I have hereunto set my hand.

GEO. W. VREELAND.